No. 697,683. Patented Apr. 15, 1902.
F. L. SMITH.
CLUTCH.
(Application filed May 14, 1901.)

(No Model.) 3 Sheets—Sheet 1.

Witnesses
C. F. Kilgore
D. Kinnendahl

Inventor
Fred L. Smith
by Sewall & Hatt
Attorneys

No. 697,683. Patented Apr. 15, 1902.
F. L. SMITH.
CLUTCH.
(Application filed May 14, 1901.)
(No Model.) 3 Sheets—Sheet 2.
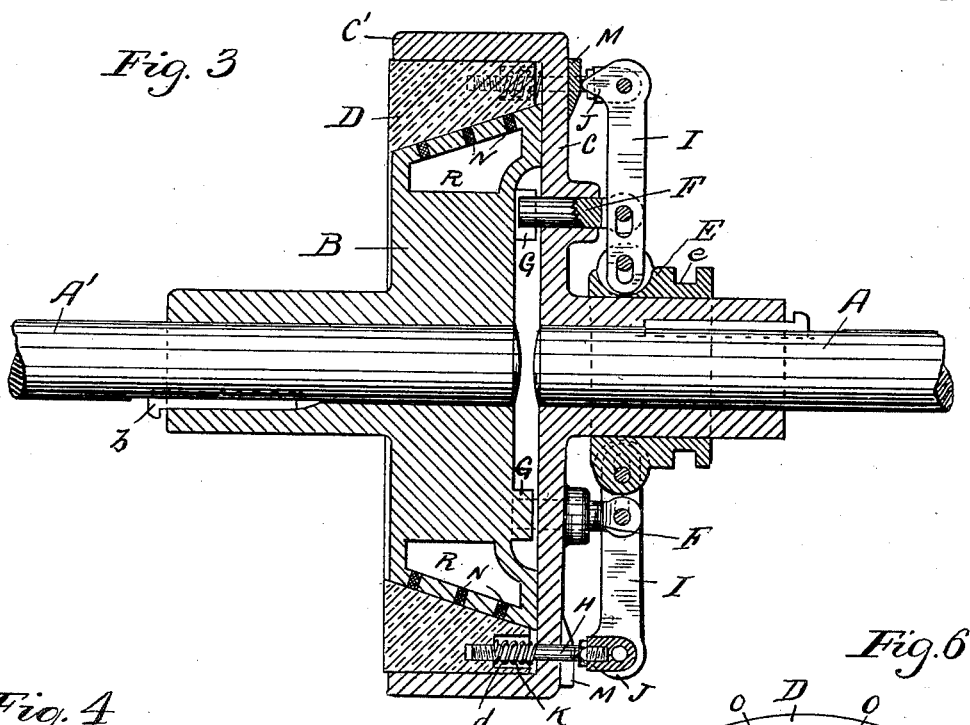
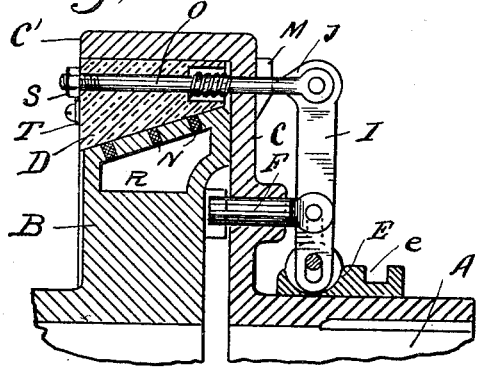
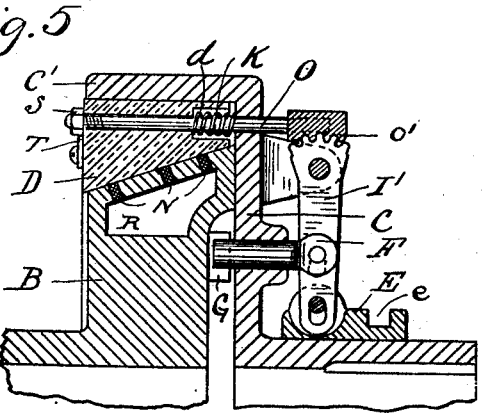
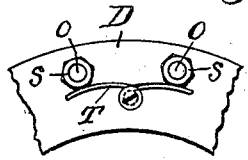
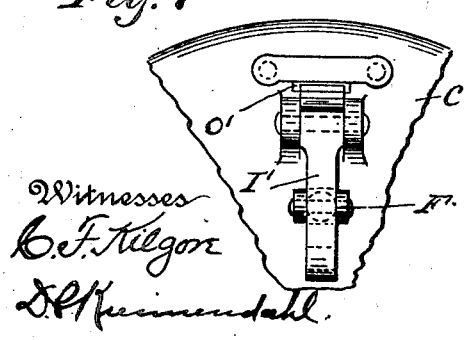
Witnesses
C. F. Kilgore
D. C. Kinnunendahl
Inventor
Fred L. Smith
by Simonds & Hart
Attorneys No. 697,683. Patented Apr. 15, 1902.
F. L. SMITH.
CLUTCH.
(Application filed May 14, 1901.)
(No Model.) 3 Sheets—Sheet 3.
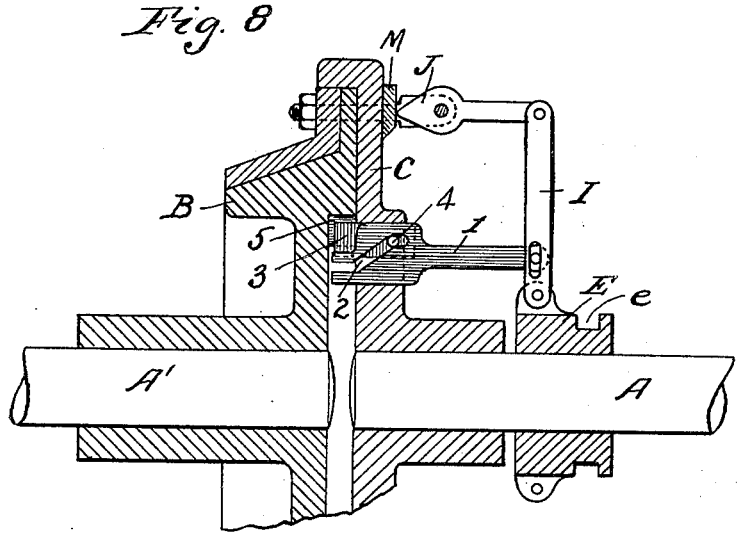
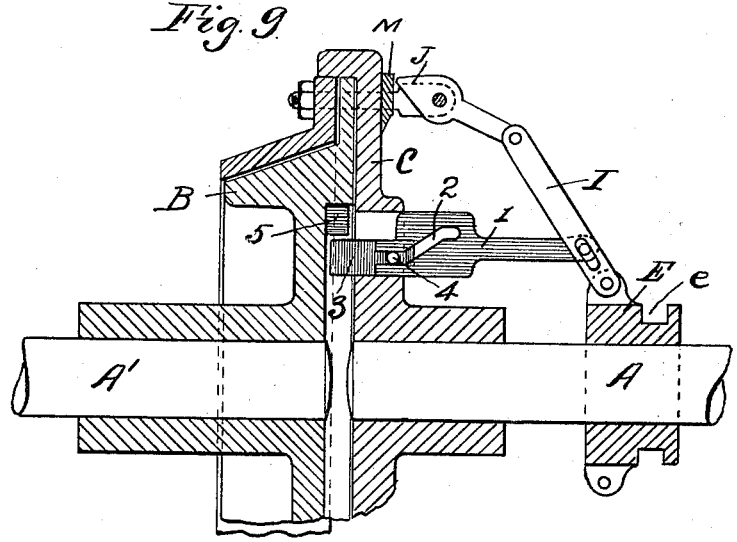
Witnesses Inventor

UNITED STATES PATENT OFFICE.

FRED L. SMITH, OF FRANKLIN FALLS, NEW HAMPSHIRE.

CLUTCH.

SPECIFICATION forming part of Letters Patent No. 697,683, dated April 15, 1902.

Application filed May 14, 1901. Serial No. 60,218. (No model.)

*To all whom it may concern:*

Be it known that I, FRED L. SMITH, a citizen of the United States, and a resident of Franklin Falls, in the county of Merrimack, State of New Hampshire, have invented certain new and useful Improvements in Clutches, of which the following is a specification.

Figure 1 represents one form of my improved clutch, the view being in section on the line $x\,x$ of Fig. 2, the clutch being disengaged. Fig. 2 is an end view of the clutch with parts broken away to show construction. Fig. 3 is a view similar to Fig. 1, but showing the clutch members engaged. Fig. 4 is a detail of a modification. Fig. 5 is a detail of a modification. Fig. 6 is a detail of a nut-locking device. Fig. 7 is a detail view of the lever which operates the clutch-ring. Figs. 8 and 9 are details showing a modification of my positive driving device.

Referring to the drawings, A A' are the parts of a rotary shaft. B denotes one member of the clutch, of a frusto-conical shape, keyed to the shaft A', as at $b$.

C denotes the other member of the clutch, keyed to the shaft A, this member of the clutch having a flange C' formed thereon.

D denotes a wedge-shaped ring fitted to the frusto-conical clutch member and to the flange C'. This ring D may be a solid ring or it may be split at one or more points. In order to connect the two shafts A A', so that they will rotate together, the ring D is drawn into the space between the flange and the frusto-conical clutch member by any suitable means, producing a frictional drive.

The means which I employ for drawing the ring D into engagement with the rim C' and the member B are clearly shown in the drawings. Bolts H are secured to the ring D and extend through the holes in the member C. The outer ends of the bolts are connected with radial levers I, having formed thereon cams J, which move upon the cam-plates M. The inner ends of the levers I are secured to a sliding sleeve E on the hub of the member C, this sliding sleeve being provided with a groove $e$, in which the shipper for engaging or disengaging the parts rests. In sockets $d$ in the ring D are located springs K, encircling the bolts H and adapted to throw the ring D out of engagement with the clutch parts when they are disengaged.

The operation of the device is clear. Supposing the clutch members to be disengaged, the parts will occupy the position shown in Fig. 1, the point of the cam J resting on the incline face of the cam-plate M. To engage the clutch members, the sliding sleeve E is moved to the position shown in Fig. 3. This movement causes the cam J to ride up the incline-surface of the cam-plate M. This action of the cam causes it to move away from the part C, drawing with it the ring D, wedging said ring firmly between the rim C' and the member B.

Oil-reservoirs R are formed in the member B, the oil being conducted through porous blocks N to the frictional surface of the part B, keeping it well oiled without attention. In connection with this frictional drive I also provide for a positive drive in a very simple manner. Lugs G are formed on the member B, and pins F, having a bearing in the member C, are connected with the levers I, so that they move with said levers and engage the lugs G when the clutch members are in engagement, as shown in Fig. 3, and are moved out of the path of the lugs when the clutch members are disengaged, as shown in Fig. 1.

The modification shown in Figs. 4 and 6 illustrates a method of securing the bolts to the wedge-shaped ring D wherein the bolts O pass through the ring D and are engaged by nuts S, which are locked by the spring T. This modification presents a novel method of taking up the wear of the parts.

Fig. 5 illustrates a modification of the means employed for moving the ring D, and, as shown, the bolt O is toothed, as at $o'$, and the outer end of the lever I' is formed into a toothed segment engaging the teeth in the head of the bolt.

Fig. 7 shows a back view of the lever I' of Fig. 6 and its pivotal connection with the bolts H, levers I', and pins F.

Figure 1:
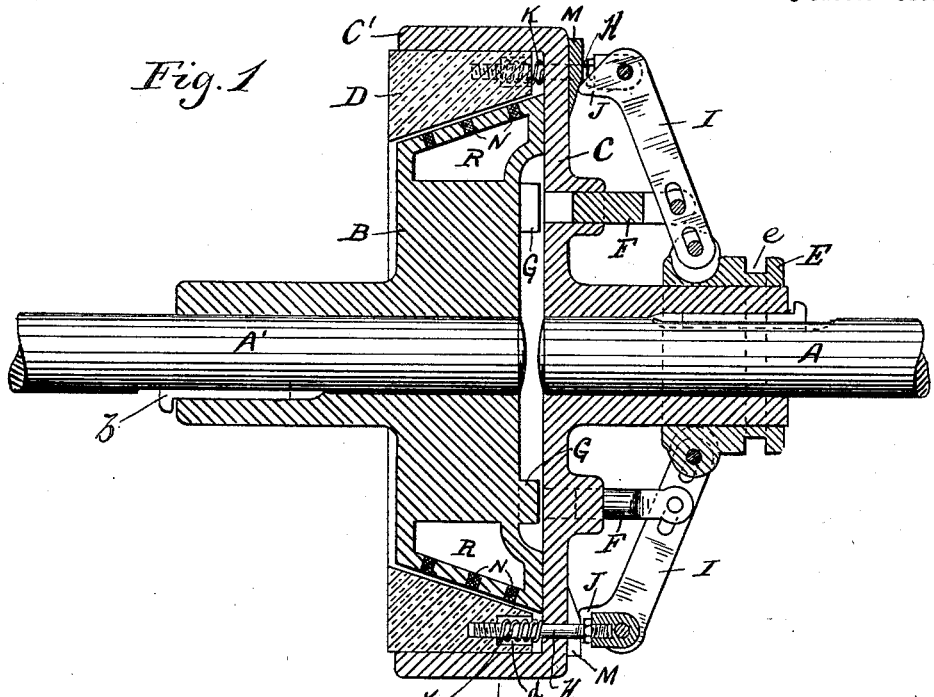
Figure 2:
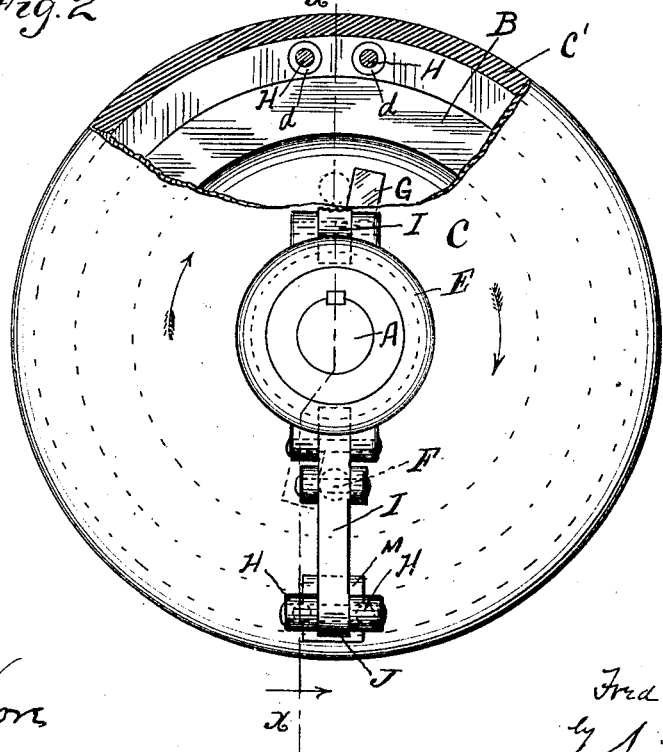

Fig. 8 illustrates a modification of my positive driving device. In this modification I pivotally secure to the lever I a plate 1, having a cam-slot 2, and the bolt 3 has a lug 4, which rides in this cam-slot. Lugs 5 are formed on the clutch member B. The plate 1 has a longitudinal motion, controlled by the movement of the lever I. The bolt 3 has a radial motion, controlled by the cam-slot 2 in the plate 1. It is clear that when the parts are disengaged, as shown in Fig. 9, the plate 1 is at the inward limit of its movement and the bolt 3 is drawn out of engagement with the lugs 5. When the clutches are engaged, the lug 4 on the bolt 3 rides up the cam-slot 2 as the plate 1 is moved outwardly, thus bringing the bolt into engagement with the lugs 5. This arrangement of the parts necessitates a change in the shape of the cam end of the lever I, as is clearly shown in the drawings.

I claim as my invention—

1. In combination in a clutch, two alined shafts, a frusto-conical member secured to one shaft, a coacting member secured to the other shaft and having a cylindric rim surrounding the first member, a ring having a cylindrical outer face fitting within said rim and an inclined inner face adapted to make frictional contact with the frusto-conical member, bolts connected with said ring and passing through the cylindric member, and means for moving said bolts longitudinally, substantially as described.

2. In a clutch, the combination with two members secured to two alined shafts, a wedge-shaped ring interposed between said members, bolts secured to said ring and passing through one of the members, and cam-plates on the latter; of a sleeve sliding on the hub of the last-mentioned member, radial levers connecting said sleeve with said bolts, and cams riding on said plates, as and for the purpose set forth.

3. In a clutch, the combination with two members secured to two alined shafts, a wedge-shaped ring interposed between said members, bolts secured to said ring and passing through one of the members, cam-plates on the latter and lugs on the other member; of a sleeve sliding on the hub of the last-mentioned member, radial levers connecting said sleeve with said bolts, cams riding on said plates, and positive clutch devices connected with and operated by said levers and passing through said clutch member into engagement with the lugs on the other member, substantially as described.

4. In a clutch, the combination with two adjacent clutch members secured to two alined shafts, a frictional clutch mechanism near their peripheries, a sliding sleeve, and radial levers connecting said sleeve with said mechanism for moving the latter; of lugs on the face of one member, plates connected with said levers and having cam-slots, and bolts moving in radial grooves in the other member and having lugs engaged by said slots, as and for the purpose set forth.

FRED L. SMITH.

Witnesses:
FRANK PROCTOR,
A. L. SMYTHE.